United States Patent [19]

Erhage

[11] Patent Number: 5,761,101

[45] Date of Patent: Jun. 2, 1998

[54] DEVICE AND METHOD FOR FREQUENCY GENERATION

[75] Inventor: Lars Ingemar Erhage, Göteborg, Sweden

[73] Assignee: Telefonaktiebolaget LM Ericsson, Stockholm, Sweden

[21] Appl. No.: 570,513

[22] Filed: Dec. 11, 1995

[30] Foreign Application Priority Data

Dec. 12, 1994 [SE] Sweden ................... 9404311

[51] Int. Cl.$^6$ ................... G06F 1/02; H03M 1/66
[52] U.S. Cl. ................... 364/721; 364/718.02
[58] Field of Search ................... 364/721; 328/14

[56] References Cited

U.S. PATENT DOCUMENTS

| | | | |
|---|---|---|---|
| 4,901,265 | 2/1990 | Kerr et al. | 364/721 |
| 4,951,237 | 8/1990 | Essenwanger | 364/721 |
| 5,014,231 | 5/1991 | Reinhardt et al. | 364/721 |
| 5,291,428 | 3/1994 | Twitchell et al. | 364/602 |
| 5,554,987 | 9/1996 | Ooga | 364/721 |

OTHER PUBLICATIONS

*Proceedings of the 1993 IEEE International Frequency Control Symposium*, Victor S. Reinhardt, pp. 230–241 (2–4 Jun. 1993).

Primary Examiner—David H. Malzahn
Attorney, Agent, or Firm—Burns, Doane, Swecker & Mathis, L.L.P.

[57] ABSTRACT

The invention relates to a device for reducing unwanted frequency components in digital frequency generation, comprising an accumulator device (4, 5) for generating output signals depending on an input code (F) corresponding to a desired frequency, the accumulator device (4, 5) being connected to at least one memory unit (6, 7) which comprises codes corresponding to wave shapes, and further comprising a generator (1) for generating a random code (P) and a digital/analog converter (9) for generating analog wave shapes. The invention is characterized in that it comprises modulation means (2, 3) for generating a first modulated signal ($F_{r1}$) constituting the sum of the input code (F) and the random code (P) and for generating a second modulated signal ($F_{r2}$) constituting the difference between the input code (F) and the random code (P), and a calculation unit (8) for regenerating a code corresponding to said input code (F). The invention provides a reduction of unwanted frequency components, so-called spurious components.

6 Claims, 3 Drawing Sheets

DEVICE AND METHOD FOR FREQUENCY GENERATION

TECHNICAL FIELD

The present invention relates to a device and a method for frequency generation. In particular, the invention can be applied in frequency generation for radio communication in which a so-called direct digital synthesizer is utilized. The invention is intended to be used for reducing unwanted frequency components, so-called spurious components.

BACKGROUND OF THE INVENTION

In the field of radio communications various devices for frequency generation are known. In applications which demand a quick switching between different frequencies, this can be accomplished by means of a so-called direct digital synthesizer (below referred to as DDS). A DDS has a very high frequency resolution and can change the frequency of the signal in a manner which is continuous with respect to the phase, as opposed to frequency generators which for example use a so-called phase-locked loop, which have to wait for phase transients in order to lock during switching of the frequency. A DDS is based on digital technology and may be of insignificant size, weight and power consumption.

A DDS may comprise a counter which addresses a digital reference table containing samples of a desired wave shape. The output signal from the reference table is supplied to a digital/analog converter which generates the desired wave shape in an analog form. However, this method is inflexible due to the fact that the only way to change the frequency of the wave shape is to change the clock frequency to the counter. In order to solve this problem, a so-called phase accumulator can be used in a DDS to generate the address to the reference table. The input parameters to such a DDS are a frequency control word, which can be generated by a digital processor, and the clock frequency of the system.

A phase accumulator comprises a register and a digital adder with a hold-circuit on its output. The hold circuit addresses the reference table and is connected back to one of the inputs of the adder. The frequency control word of the device is supplied to the other input of the adder. The phase accumulator rotates a vector around a phase circle in discrete steps with a constant clock rate. The frequency control word determines the size of the step by which the sum of the chase accumulator is increased. The size of the steps determines the frequency of the wave shape according to the equation $$F_o = M * F_c / 2^n$$

in which $F_o$ is the frequency of the output signal, M is the size of the frequency step stored in the register, $F_c$ is the clock frequency and N is the number of bits in the phase accumulator.

In the above-mentioned DDS device, both the frequency resolution and the phase resolution are determined by the word length in the phase accumulator. If a high resolution is desired, many bits are required in the phase accumulator. For example, a phase accumulator with a resolution of 8 bits provides 256 discrete phase steps.

When analyzing the spectrum of the output signal it will be apparent that the spectrum comprises three general sources of distortion. The first source, $\epsilon_p$, originates from the truncation of the bits of the phase accumulator before the reference table is addressed. The second source of distorsion, $\epsilon_T$, is due to the finite word length of the wave shape which is stored in the reference table. The third source of distortion, $\epsilon_{DA}$, is due to noise in the digital/analog conversion. The first error source, $\epsilon_p$, is the most serious one, since it is an exponential function of the address length of the reference table. An analysis shows that the output signal consists of a sine signal having the desired frequency and a cosine signal which is modulated with an error sequence $\epsilon_p(n)$ which depends on the above-mentioned error source $\epsilon_p$. This error sequence has a repeating progression, which implies that the spectrum of the output signal comprises the desired frequency as well as unwanted frequency components, so-called spurious components, which appear at distinct frequencies. A diagram of the spectrum (i.e. the relation between the frequency and the output power) of the output signal from such a DDS is illustrated in FIG. 1, from which it is apparent that the spurious components occur at distinct frequencies in the spectrum.

A device for reducing unwanted spurious components in a DDS is previously known from U.S. Pat. No. 5,014,231. In this regard, random number are generated and added to the word in a reference table. In this manner, the spurious components are distributed randomly over the entire frequency spectrum.

A device for reducing spurious components by introducing an "offset" in the frequency word supplied to an accumulator is previously known from U.S. Pat. No. 4,951,237.

SUMMARY OF THE INVENTION

A main object of the present invention is to provide an improved method and device in connection with a so-called direct digital synthesizer (DDS) in order to eliminate unwanted frequency components in the form of spurious components at distinct frequencies. This is achieved by means of a device as initially mentioned, the features of which will become apparent from the principal stated below.

The invention is based on the principle that a pseudo-random code is generated. By means of this code, the input code which corresponds to a desired frequency can be modulated. In accordance with the invention, a code corresponding to said input code is regenerated in a calculation unit. The regeneration of the input code is carried out in a manner so that the pseudo-random code does not influence the desired frequency.

By using a first and a second phase accumulator, to which signals constituting the sum and the difference respectively of an input code and a random code are supplied, the error sequence which is present in the output signal will not be of a periodical but instead of a random nature. In this manner, unwanted frequency components will be greatly reduced.

BRIEF DESCRIPTION OF THE DRAWINGS

The invention will be described in greater detail in the following with reference to the annexed drawings, in which.

PREFERRED EMBODIMENT

Figure 1:
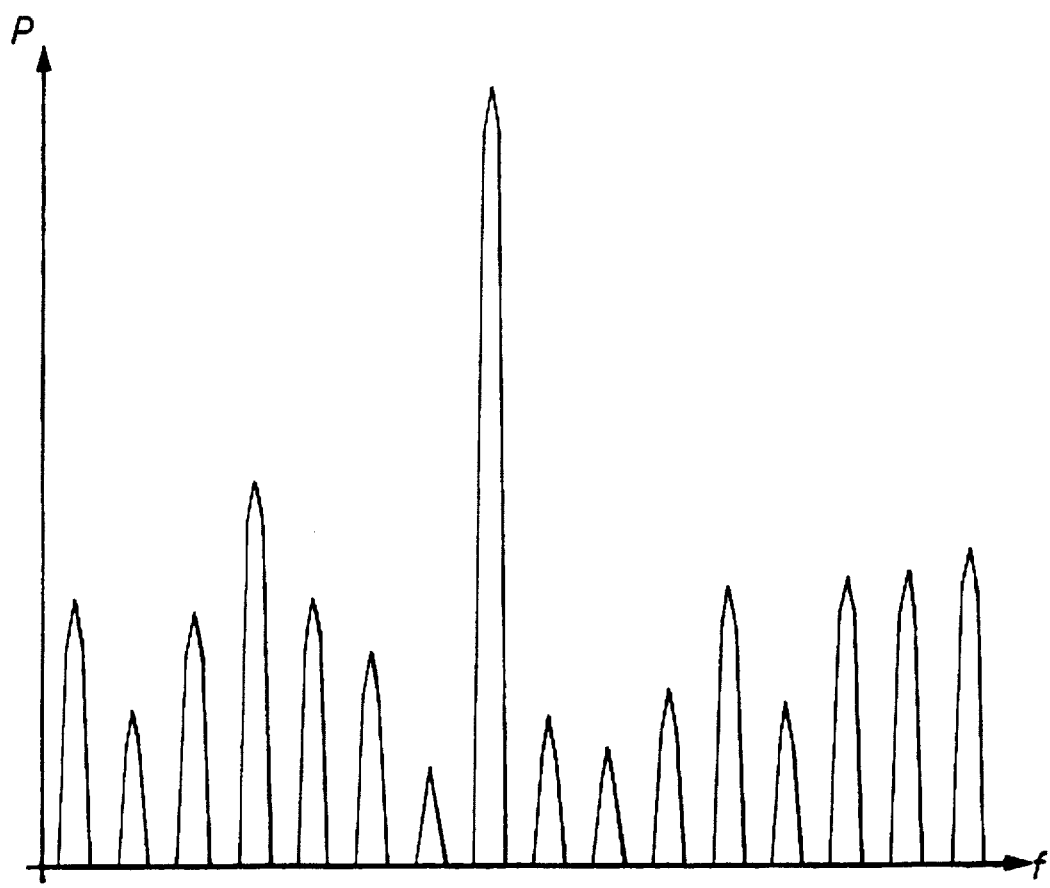
FIG. 1 shows a spectrum of a conventional DDS.
Figure 2:
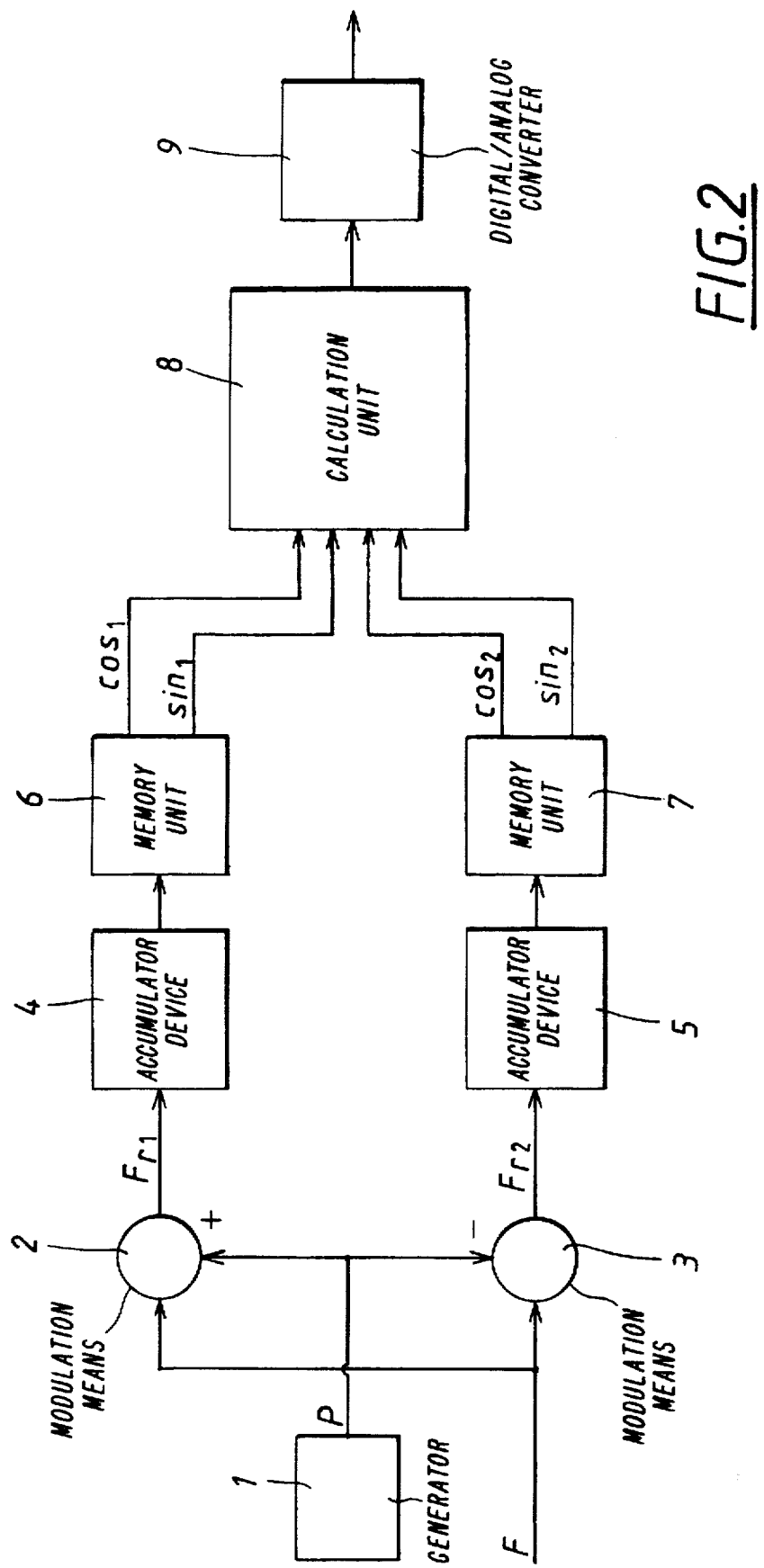
FIG. 2 shows schematically a device according to the present invention.

FIG. 2 shows, in the form of a block diagram, a device according to the present invention. In accordance with a preferred embodiment, the device comprises a code generator 1 for generating a pseudo-random code P. This pseudocode P is added to a desired frequency word in an adder 2 so as to produce an output signal $F_{r1}=F+P$.

Furthermore, the pseudocode P is subtracted from the frequency word F in a subtractor 3. In this manner, a further output signal $F_{r2}=F-P$ is produced. The output signal $F_{r1}$ from the adder 2 is supplied to the input of a first phase accumulator 4, whereas the output signal $F_{r2}$ from the subtractor 3 is supplied to the input of a second phase accumulator 5.

The output signal from the first phase accumulator 4 is supplied to a first reference table 6, i.e. a memory, which comprises a cosine wave as well as a sine wave, i.e. the cosine wave phase shifted 90°. These two curves can be regarded as the real part and the imaginary part, respectively, of the cosine wave. The output signals from the first reference table 6 are constituted by a real part $cos_1$ and an imaginary part $sin_1$. In a corresponding manner, the output signal from the second phase accumulator 5 is supplied to a second reference table 7 of a type which corresponds to the first reference table 6. In a corresponding manner, the output signals from the second reference table 7 are constituted by a real part $cos_2$ and an imaginary part $sin_2$.

The four output signals $cos_1$, $sin_1$, $cos_2$ and $sin_2$ from the reference tables 6, 7 are supplied to a complex multiplying unit 8 which performs the operation $$(a_1+jb_1)(a_2+jb_2)=a_1a_2-b_1b_2+j(a_1b_2+a_2b_1)$$

where $a_1=\cos(F_{r1})$, $b_1=\sin(F_{r1})$, $a_2=\cos(F_{r2})$, $b_2=\sin(F_{r2})$ and j represents the imaginary portion of the complex equation such that $j*j=-1$. Therefore, the real portion of the equation, designated as R, is $a_1a_2-b_1b_2$.

Only the real part R is used from the complex multiplying unit 8, which real part can be written as $$R=\cos(F_{r1})\cos(F_{r2})-\sin(F_{r1})\sin(F_{r2})=\frac{1}{2}[\cos(F_{r1}-F_{r2})+\cos(F_{r1}+F_{r2})]-\frac{1}{2}[\cos(F_{r1}-F_{r2})-\cos(F_{r1}+F_{r2})]=\cos(F_{r1}+F_{r2}).$$

Since $F_{r1}=F+P$ and $F_{r2}=F-P$, it follows that $$R=\cos(F_{r1}+F_{r2})=\cos(F+P+F-P)=\cos(2F)$$

In this manner, the desired frequency is obtained from a suitable selection of F. Finally, the output signal from the complex multiplying unit is supplied to a digital/analog converter 9 for generating an output analog wave shape.

As is apparent, the pseudocode P does not influence the output frequency. Instead, it provides a random contribution to the frequency word F in the form of the words $F_{r1}$ and $F_{r2}$.

Figure 3:
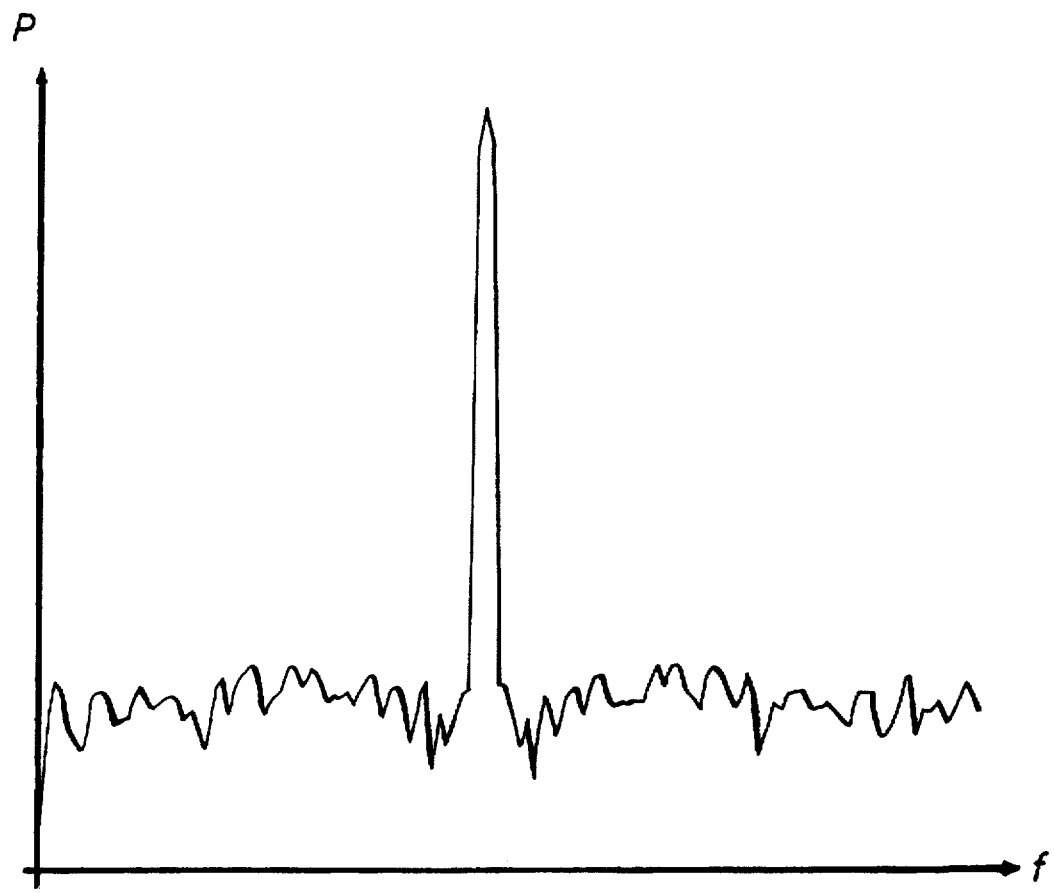
FIG. 3 shows a spectrum of the device according to the invention.

FIG. 3 shows a diagram of a spectrum (the output power as a function of the frequency) of the output signal according to the present invention. In conventional DDS devices, a problem is present in that the phase accumulator is repeatedly supplied with the same input data, which implies that the output signal is modulated with a periodical error sequence. In the device according to the invention, the input data to the phase accumulators 4, 5 is changed each clock pulse due to the fact that the pseudo-random code P is used. In this manner, the error sequence of the output signal is not periodical but instead has a random character, which is illustrated in FIG. 3.

In order to further reduce the spurious components which may occur due to quantizing errors due to truncation of the number of bits to the digital/analog converter 9, in accordance with the invention a noise component in the form of an equally distributed random number S can be inserted in the reference table 6. Thus, if the component $a_1=\cos(F_{r1})$ is replaced with $S+\cos(F_{r1})$, in accordance with that which has been mentioned above, it follows that $$\begin{aligned}R_{noise} &= (S+\cos(F_{r1}))\cos(F_{r2})-\sin(F_{r1})\sin(F_{r2}) = \\ &= S\cos(F_{r2})+\cos(F_{r1})\cos(F_{r2})-\sin(F_{r1})\sin(F_{r2}) = \\ &= S\cos(F_{r2})+\cos(F_{r1}+F_{r2})\end{aligned}$$

It will thus be apparent that the additional term $S\cos(F_{r2})$ will be added to the signal R, which additional term is chosen in a random manner, both with respect to its frequency and amplitude. This provides an additional noise which to a great extent will further reduce the influence of unwanted spurious components.

The invention is not limited to the described embodiments, but may be varied freely within the scope of the appended claims. For example, different types of algorithms may be used in order to generate an contribution to the input code F.

I claim:

1. A device for reducing unwanted frequency components in digital frequency generation, comprising:

a code generator for generating a random code;

an input code corresponding to a desired frequency;

modulation means for generating:

(i) a first signal representing a sum of the input code and the random code, and (ii) a second signal representing a difference between the input code and the random code;

an accumulator device for generating output signals based on said first and second signals;

a memory unit, connected to said accumulator device, for outputting codes corresponding to wave shapes responsive to said output signals;

a calculation unit for regenerating a code corresponding to the input code based on said codes output from the memory unit; and a digital/analog converter for generating an analog wave shape based on said regenerated code.

2. Device according to claim 1, wherein said accumulator device comprises a first phase accumulator to which the first signal is supplied, and a second phase accumulator to which the second signal is supplied.

3. Device according to claim 1, wherein said memory unit comprises a cosine table and a sine table.

4. Device according to claim 1, wherein said calculation unit comprises a complex multiplying unit which is arranged between said memory unit and said digital/analog converter.

5. A method for reducing unwanted frequency components in digital frequency generation comprising the steps of:

generating a random code;

providing an input code corresponding to a desired frequency;

generating a first signal representing a sum of the random code and the input code;

generating a second signal representing a difference between the random code and the input code;

accumulating the first and second signals and generating output signals therefrom;

inputting said output signals to a memory device which outputs codes corresponding to wave shapes;

regenerating a code corresponding to the input code using said codes from said memory unit; and creating analog wave shapes using said regenerated code.

6. Method according to claim 5, wherein said input code is regenerated by means of a complex multiplication of codes supplied from said memory unit.

* * * * *